US010662871B2

United States Patent
Asakawa et al.

(10) Patent No.: US 10,662,871 B2
(45) Date of Patent: May 26, 2020

(54) NOZZLE DRIVE MECHANISM, TURBOCHARGER, VARIABLE CAPACITY TURBOCHARGER

(71) Applicant: IHI Corporation, Koto-ku (JP)

(72) Inventors: Takao Asakawa, Tokyo (JP); Kenichi Segawa, Tokyo (JP); Takahiro Kobayashi, Tokyo (JP); Ryota Sakisaka, Tokyo (JP); Kazuko Takeuchi, Tokyo (JP); Kenji Bunno, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/043,788

(22) Filed: Jul. 24, 2018

(65) Prior Publication Data

US 2018/0328271 A1 Nov. 15, 2018

Related U.S. Application Data

(63) Continuation of application No. PCT/JP2017/005280, filed on Feb. 14, 2017.

(30) Foreign Application Priority Data

Feb. 19, 2016 (JP) .................................. 2016-030012

(51) Int. Cl.
*F02B 37/22* (2006.01)
*F01D 17/16* (2006.01)
(Continued)

(52) U.S. Cl.
CPC ............ *F02B 37/22* (2013.01); *F01D 17/165* (2013.01); *F01D 17/20* (2013.01); *F02B 37/24* (2013.01); *F16H 21/44* (2013.01); *Y02T 10/144* (2013.01)

(58) Field of Classification Search
CPC ........ F02B 37/22; F02B 37/24; F01D 17/165; F01D 17/20; F16H 21/44; Y02T 10/144
(Continued)

(56) References Cited

U.S. PATENT DOCUMENTS

| 4,643,640 A | * | 2/1987 | Burdette | ............... F01D 17/165 |
| | | | | 415/164 |
| 4,654,941 A | * | 4/1987 | Burdette | ............... F01D 17/165 |
| | | | | 29/889.22 |

(Continued)

FOREIGN PATENT DOCUMENTS

| CN | 103189613 | 7/2013 |
| JP | 63-021330 | 1/1988 |

(Continued)

OTHER PUBLICATIONS

International Preliminary Report on Patentability and Written Opinion dated Aug. 30, 2018 in PCT/JP2017/005280.

(Continued)

*Primary Examiner* — Thai Ba Trieu
*Assistant Examiner* — Dapinder Singh
(74) *Attorney, Agent, or Firm* — Oblon, McClelland, Maier & Neustadt, L.L.P.

(57) ABSTRACT

Provided is a nozzle drive mechanism, including: a bearing having a bearing hole; a drive shaft which is axially supported in the bearing hole so as to be rotatable; a drive lever including: an insertion portion into which another end portion (end portion) of the drive shaft protruding from the bearing hole is inserted; and a coupling portion, which is positioned on the bearing side with respect to a center of the drive shaft in an axial direction, and projects outward in a radial direction of the drive shaft from the insertion portion; a link pin coupled to the coupling portion; and a rod member, which is connected to the link pin, is positioned on (Continued)

a side opposite to the bearing with respect to the coupling portion, and is provided to an actuator.

9 Claims, 4 Drawing Sheets

(51) Int. Cl.
  *F02B 37/24* (2006.01)
  *F01D 17/20* (2006.01)
  *F16H 21/44* (2006.01)
(58) Field of Classification Search
  USPC .................................................. 60/605.1
  See application file for complete search history.

(56) References Cited

U.S. PATENT DOCUMENTS

| | | | | |
|---|---|---|---|---|
| 4,659,295 A * | 4/1987 | Burdette | ............... | F01D 17/165 415/164 |
| 4,804,316 A * | 2/1989 | Fleury | ................... | F01D 17/165 415/134 |
| 6,212,889 B1 * | 4/2001 | Martin | ................... | F15B 15/068 60/602 |
| 6,269,642 B1 * | 8/2001 | Arnold | ................... | F01D 17/165 415/163 |
| 6,527,508 B2 * | 3/2003 | Groskreutz | ........... | F01D 17/165 415/150 |
| 6,599,087 B2 * | 7/2003 | Arnold | ................... | F01D 11/003 415/163 |
| 6,729,134 B2 * | 5/2004 | Arnold | ................... | F01D 5/141 415/144 |
| 7,247,004 B2 * | 7/2007 | Suganami | ............. | F02B 37/186 417/408 |
| 2013/0243572 A1 | 9/2013 | Heidingsfelder et al. | | |

FOREIGN PATENT DOCUMENTS

| | | |
|---|---|---|
| JP | 07-004368 | 1/1995 |
| JP | 08-326566 | 12/1996 |
| JP | 2001-132464 | 5/2001 |
| JP | 2007-187015 | 7/2007 |
| JP | 2010-071138 | 4/2010 |
| JP | 2012-017667 | 1/2012 |
| JP | 5256977 | 8/2013 |
| JP | 2013-217305 | 10/2013 |
| JP | 2013-545035 | 12/2013 |
| JP | 2014-181590 | 9/2014 |
| KR | 10-2014-0004648 | 1/2014 |
| WO | WO 2012/078363 A2 | 6/2012 |

OTHER PUBLICATIONS

International Search Report dated Apr. 18, 2017 in PCT/JP2017/005280 filed Feb. 14, 2017 (with English Translation).
Written Opinion dated Apr. 18, 2017 in PCT/JP2017/005280 filed Feb. 14, 2017.

* cited by examiner

NOZZLE DRIVE MECHANISM, TURBOCHARGER, VARIABLE CAPACITY TURBOCHARGER

CROSS REFERENCE TO RELATED APPLICATIONS

This application is a continuation application of International Application No. PCT/JP2017/005280, filed on Feb. 14, 2017, which claims priority to Japanese Patent Application No. 2016-030012, filed on Feb. 19, 2016, the entire contents of which are incorporated by reference herein.

BACKGROUND ART

Technical Field

The present disclosure relates to a nozzle drive mechanism in which a link pin coupled to a drive lever is connected to a rod member of an actuator, and relates also to a turbocharger and a variable capacity turbocharger.

Related Art

Hitherto, a turbocharger of a variable capacity type has been widely used. In such a turbocharger, for example, as disclosed in Patent Literature 1, a plurality of nozzle vanes are annularly arrayed in a flow passage for introducing exhaust gas from a turbine scroll flow passage to a turbine impeller. The nozzle vanes are mounted to blade shafts. When the blade shafts are rotated by power of an actuator, angles of the nozzle vanes are changed in the flow passage along with the rotation of the blade shafts. A flow passage width (so-called nozzle throat width) is changed so that a flow rate of the exhaust gas flowing through the flow passage is controlled.

Further, a link plate is arranged on a power transmission path from the actuator to the blade shafts. The link plate is, for example, welded to one end of a drive shaft. The drive shaft is axially supported in a bearing hole of an annular bush (bearing). A drive lever is mounted to another end of the drive shaft.

As disclosed in Patent Literature 1, the drive lever includes an annular insertion portion. The drive shaft is inserted into the insertion portion. On a side of the insertion portion away from the bush (another end side of the drive shaft), a coupling portion is formed. The coupling portion projects outward in a radial direction of the drive shaft. A link pin is inserted into the coupling portion. A rod member of the actuator is coupled to the drive lever through intermediation of the link pin. When rotation power is transmitted from the rod member to the drive lever, the drive shaft rotates. The rotation of the drive shaft causes the link plate to swing. With this, angles of the plurality of nozzle vanes are changed through intermediation of, for example, a drive ring.

CITATION LIST

Patent Literature

Patent Literature 1: Japanese Patent No. 5256977 B2

SUMMARY

Technical Problem

In the nozzle drive mechanism configured to drive the nozzle vanes in the manner as described above, contact friction is generated at a movable part. There has been a strong demand for development of a technology of improving durability against friction to deal with, for example, downsizing of an engine and increase in engine rotation speed in the future.

Therefore, it is an object of the present disclosure to provide a nozzle drive mechanism capable of improving durability against friction, a turbocharger, and a variable capacity turbocharger.

Solution to Problem

In order to solve the above problem, according to one embodiment of the present disclosure, there is provided a nozzle drive mechanism, including: a bearing having a bearing hole; a drive shaft which is axially supported in the bearing hole so as to be rotatable; a drive lever including: an insertion portion into which an end portion of the drive shaft protruding from the bearing hole is inserted; and a coupling portion, which is positioned on the bearing side of the insertion portion with respect to a center of the drive shaft in an axial direction, and projects outward in a radial direction of the drive shaft from the insertion portion; a link pin coupled to the coupling portion; and a rod member, which is connected to the link pin, is positioned on a side opposite to the bearing with respect to the coupling portion, and is provided to an actuator.

The insertion portion of the drive lever may have an exposure hole for exposing the drive shaft in a radial direction, and at least a part of the drive shaft which is exposed through the exposure hole may be welded to the insertion portion.

The coupling portion may be positioned on the bearing side with respect to the exposure hole.

In order to achieve the above-mentioned object, according to one embodiment of the present disclosure, there is provided a turbocharger including the above-mentioned nozzle drive mechanism.

In order to solve the above problem, according to one embodiment of the present disclosure, there is provided a variable capacity turbocharger, including: a drive ring supported so as to be rotatable; a link plate, which is engaged with the drive ring, and is configured to turn the drive ring; a drive shaft, which is engaged with the link plate, and is configured to turn the link plate; a drive lever, which includes a coupling portion projecting in a radial direction, is engaged with the drive shaft, and is configured to turn the drive shaft; a bearing, which receives the drive shaft inserted thereinto, and is provided between the link plate and the drive lever; and a rod member, which receives the coupling portion engaged therewith from the link plate side, and is configured to turn the drive lever.

Effects of Disclosure

According to the present disclosure, the durability against friction can be improved.

DESCRIPTION OF EMBODIMENT

Figure 1:
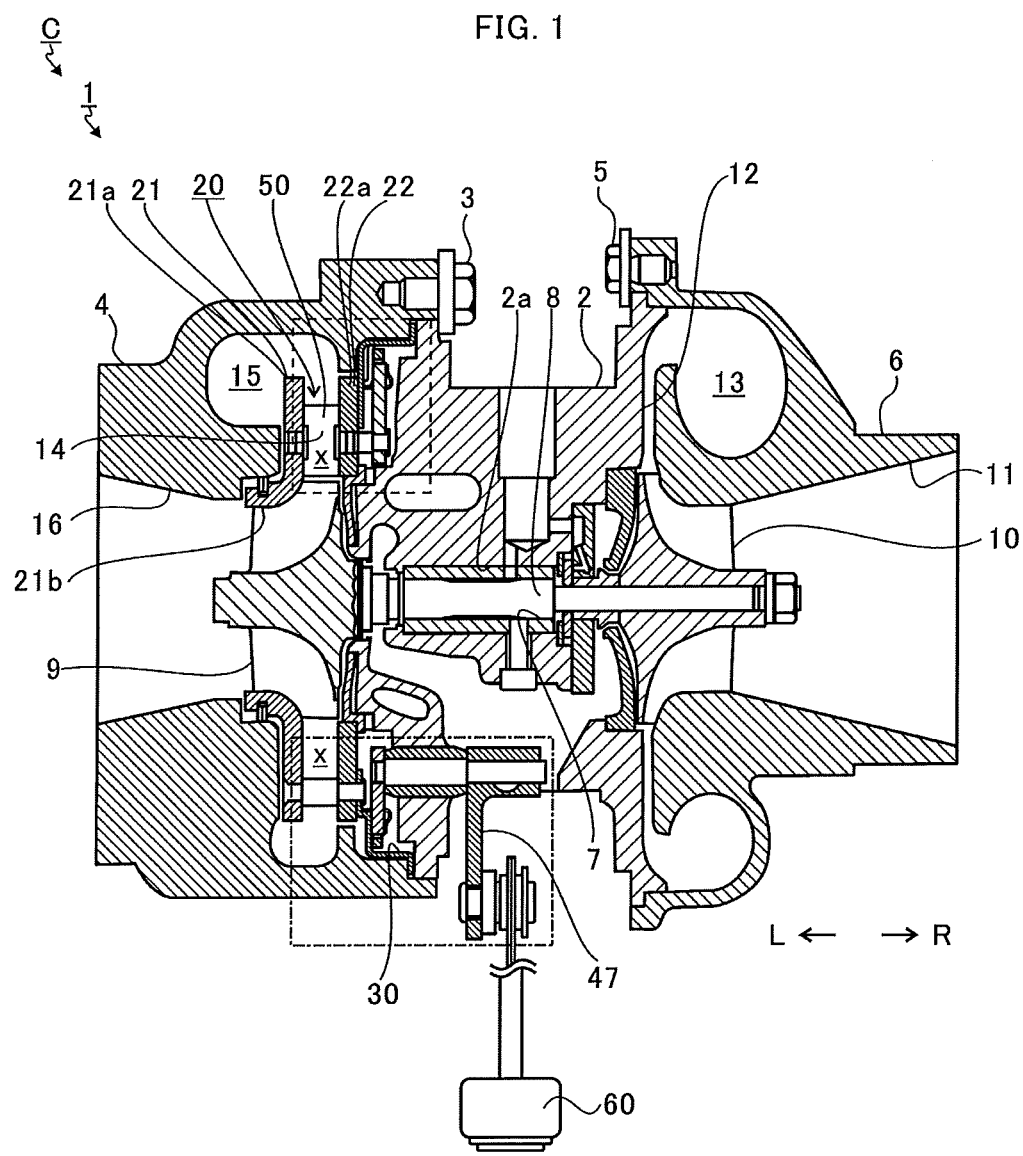
FIG. 1 is a schematic sectional view of a variable capacity turbocharger (turbocharger).

Now, with reference to the attached drawings, an embodiment of the present disclosure is described in detail. The dimensions, materials, and other specific numerical values represented in the embodiment are merely examples used for facilitating understanding, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a variable capacity turbocharger C (turbocharger). In the following description, the direction indicated by the arrow L illustrated in FIG. 1 corresponds to a left side of the variable capacity turbocharger C. The direction indicated by the arrow R illustrated in FIG. 1 corresponds to a right side of the variable capacity turbocharger C. As illustrated in FIG. 1, the variable capacity turbocharger C includes a turbocharger main body 1. The turbocharger main body 1 includes a bearing housing 2. A turbine housing 4 is coupled to the left side of the bearing housing 2 by a fastening bolt 3. A compressor housing 6 is coupled to the right side of the bearing housing 2 by a fastening bolt 5. The bearing housing 2, the turbine housing 4, and the compressor housing 6 are integrated.

The bearing housing 2 has a receiving hole 2a. The receiving hole 2a penetrates through the bearing housing 2 in a right-and-left direction of the variable capacity turbocharger C. A shaft 8 is axially supported so as to be rotatable by a radial bearing 7 which is received in the receiving hole 2a (in this embodiment, a semi-floating bearing is illustrated in FIG. 1 as an example). A turbine impeller 9 is provided to a left end portion of the shaft 8. The turbine impeller 9 is received in the turbine housing 4 so as to be rotatable. Further, a compressor impeller 10 is provided to a right end portion of the shaft 8. The compressor impeller 10 is received in the compressor housing 6 so as to be rotatable.

The compressor housing 6 has a suction port 11. The suction port 11 is opened on the right side of the variable capacity turbocharger C. An air cleaner (not shown) is connected to the suction port 11. Further, under a state in which the bearing housing 2 and the compressor housing 6 are coupled to each other by the fastening bolt 5, a diffuser flow passage 12 is formed. The diffuser flow passage 12 is formed by opposed surfaces of the bearing housing 2 and the compressor housing 6. The diffuser flow passage 12 increases pressure of air. The diffuser flow passage 12 is annularly formed so as to extend from a radially inner side to a radially outer side of the shaft 8. The diffuser flow passage 12 communicates with the suction port 11 on the radially inner side of the shaft 8 through intermediation of the compressor impeller 10.

Further, the compressor housing 6 has a compressor scroll flow passage 13. The compressor scroll flow passage 13 has an annular shape. The compressor scroll flow passage 13 is positioned, for example, on the radially outer side of the shaft 8 with respect to the diffuser flow passage 12. The compressor scroll flow passage 13 communicates with a suction port of an engine (not shown). The compressor scroll flow passage 13 communicates also with the diffuser flow passage 12. Thus, when the compressor impeller 10 is rotated, air is sucked into the compressor housing 6 through the suction port 11. The sucked air is increased in pressure and speed during a course of flowing through blades of the compressor impeller 10. The air increased in speed and pressure is increased in pressure (pressure recovery) in the diffuser flow passage 12 and the compressor scroll flow passage 13. The air increased in pressure is introduced to the engine.

Further, under a state in which the bearing housing 2 and the turbine housing 4 are coupled to each other by the fastening bolt 3, a clearance 14 is formed between opposed surfaces of the bearing housing 2 and the turbine housing 4. The clearance 14 is a space in which a flow passage "x" is arranged. Nozzle vanes 50, which are described later, are arranged in the flow passage "x". The flow passage "x" allows exhaust gas to flow therethrough. The clearance 14 is annularly formed so as to extend from a radially inner side of the shaft 8 (turbine impeller 9) toward an outer side.

Further, the turbine housing 4 has a discharge port 16. The discharge port 16 communicates with the turbine scroll flow passage 15 through the turbine impeller 9. The discharge port 16 faces a front side of the turbine impeller 9. The discharge port 16 is connected to an exhaust gas purification device (not shown).

The turbine scroll flow passage 15 communicates with a gas inflow port (not shown). Exhaust gas discharged from the engine is introduced to the gas inflow port. The turbine scroll flow passage 15 communicates also with the flow passage "x" described above. Thus, the exhaust gas introduced through the gas inflow port to the turbine scroll flow passage 15 is introduced to the discharge port 16 through the flow passage "x" and the turbine impeller 9. That is, the flow passage "x" is a passage which extends from the turbine scroll flow passage 15 to the turbine impeller 9. The exhaust gas causes the turbine impeller 9 to rotate during a course of flowing. Then, a rotational force of the turbine impeller 9 described above is transmitted to the compressor impeller 10 through the shaft 8. The air is increased in pressure by the rotational force of the compressor impeller 10, and is introduced to the suction port of the engine.

At this time, when the flow rate of the exhaust gas introduced to the turbine housing 4 changes, the rotation amounts of the turbine impeller 9 and the compressor impeller 10 change. In some cases, depending on an operating condition of the engine, the air increased in pressure to a desired pressure cannot sufficiently be introduced to the suction port of the engine. In view of the above-mentioned circumstance, a nozzle drive mechanism 20 is provided to the variable capacity turbocharger C.

The nozzle drive mechanism 20 changes a flow passage width of the flow passage "x" of the turbine housing 4. The nozzle drive mechanism 20 changes the flow speed of the exhaust gas introduced to the turbine impeller 9 in accordance with a flow rate of the exhaust gas. Specifically, when the rotation speed of the engine is low, and the flow rate of the exhaust gas is small, the nozzle drive mechanism 20 decreases an opening degree of the nozzle of the flow passage "x" to increase the flow speed of the exhaust gas introduced to the turbine impeller 9. In this manner, the nozzle drive mechanism 20 is capable of causing the turbine impeller 9 to rotate even with a small flow rate. Now, description is made of a configuration of the nozzle drive mechanism 20.

The nozzle drive mechanism 20 includes a shroud ring 21 and a nozzle ring 22. The shroud ring 21 is provided on the turbine housing 4 side. The nozzle ring 22 is provided on the bearing housing 2 side so as to be opposed to the shroud ring 21. The flow passage "x" is defined and formed by the shroud ring 21 and the nozzle ring 22.

The shroud ring 21 includes a main body portion 21a having a thin-plate ring shape. A projecting portion 21b is formed at an inner peripheral edge of the main body portion 21a. The projecting portion 21b projects toward the discharge port 16 side. Further, the nozzle ring 22 includes a main body portion 22a. The main body portion 22a has a thin-plate ring shape. The main body portion 22a has a diameter which is equal to a diameter of the main body portion 21a of the shroud ring 21. The nozzle ring 22 is arranged so as to be opposed to the shroud ring 21 while maintaining a predetermined interval.

Figure 2A:
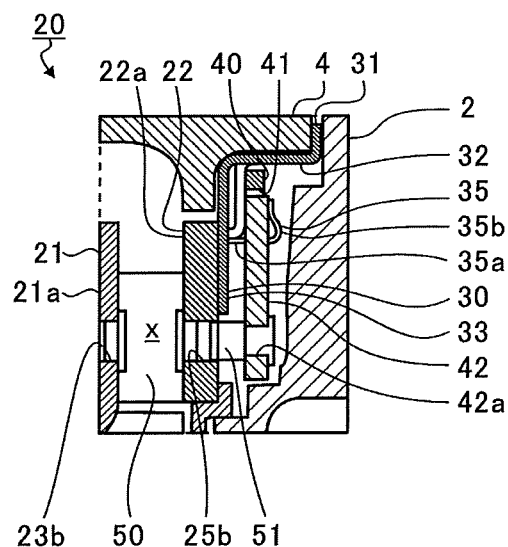
FIG. 2A is an extraction view of the broken line portion on an upper side in FIG. 1.
Figure 2B:
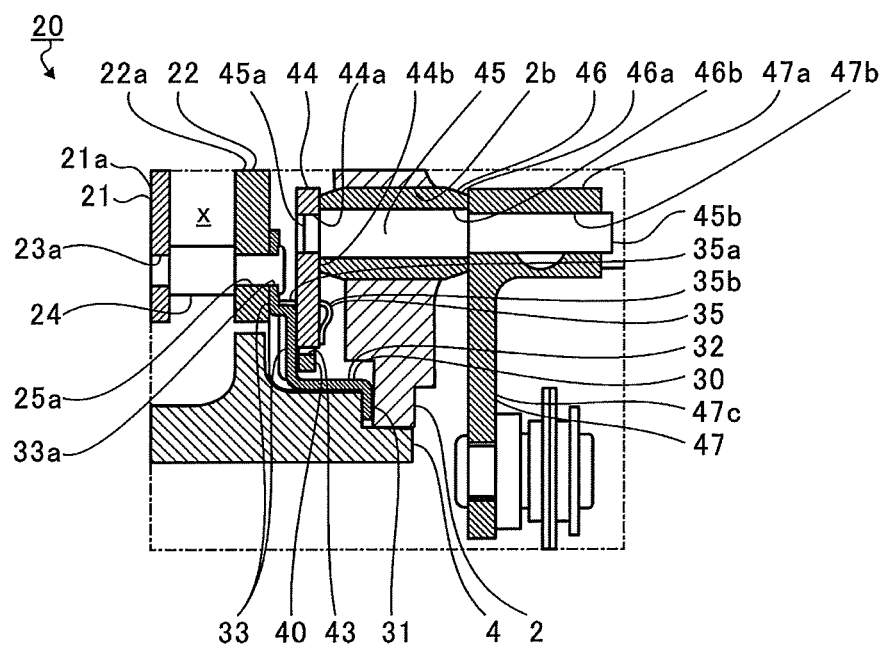
FIG. 2B is an extraction view of the one-dot chain line portion on a lower side in FIG. 1.

FIG. 2A is an extraction view of a broken line portion on an upper side in FIG. 1. FIG. 2B is an extraction view of a one-dot chain line portion on a lower side in FIG. 1. As illustrated in FIG. 2B, a pin shaft hole 23a is formed in the main body portion 21a of the shroud ring 21. The pin shaft hole 23a penetrates through the main body portion 21a in the thickness direction (axial direction of the shaft 8). A plurality of (three in this embodiment, but only one is shown in FIG. 2B) pin shaft holes 23a are formed at equal intervals in a circumferential direction.

Further, a pin shaft hole 25a is formed in the main body portion 22a of the nozzle ring 22. A plurality of (three in this embodiment, but only one is shown in FIG. 2B) pin shaft holes 25a are formed at equal intervals in a circumferential direction of the main body portion 22a. The pin shaft holes 25a penetrate through the main body portion 22a in a thickness direction (axial direction of the shaft 8). The pin shaft hole 23a formed in the shroud ring 21 and the pin shaft hole 25a formed in the nozzle ring 22 are arranged so as to be opposed to each other. A coupling pin 24 is inserted into each of the pin shaft holes 23a and 25a.

Specifically, as illustrated in FIG. 2B, one end of the coupling pin 24 is inserted into the pin shaft hole 25a of the nozzle ring 22. Another end of the coupling pin 24 is inserted into the pin shaft hole 23a of the shroud ring 21. A plurality of (three in this embodiment, but only one is shown in FIG. 2B) coupling pins 24 are arrayed at equal intervals in a circumferential direction. The coupling pin 24 maintains a constant interval between the shroud ring 21 and the nozzle ring 22 opposed to each other.

Further, the one end of the coupling pin 24 which is inserted into the pin shaft hole 25a of the nozzle ring 22 projects toward the right side from the nozzle ring 22. The projecting part of the coupling pin 24 is caulked. In this manner, the support ring 30 is fixed to the right side of the nozzle ring 22. The support ring 30 is formed of a cylindrical member. The support ring 30 has, for example, a sectional shape obtained by bending a member having a thin-plate shape (see FIG. 1).

Figure 3:
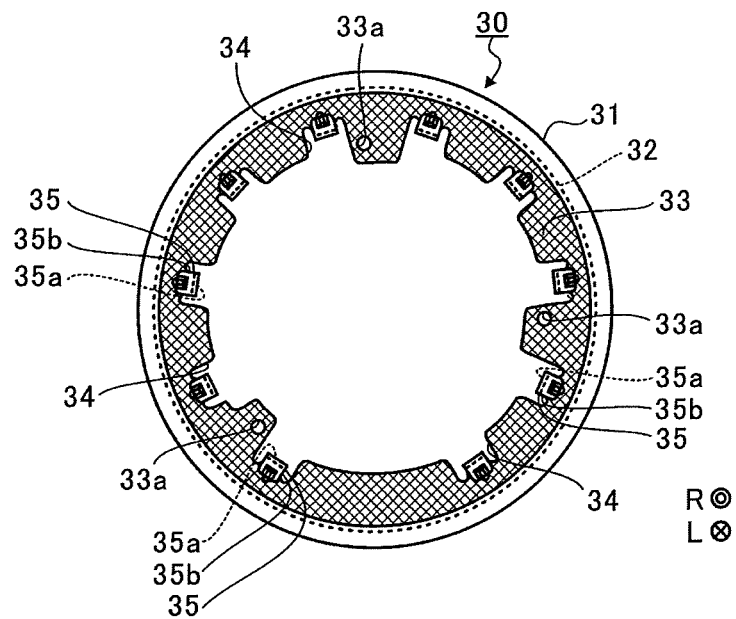
FIG. 3 is a plan view of a support ring.

FIG. 3 is a plan view of the support ring 30. The near side in the drawing sheet of FIG. 3 is oriented toward the right side in FIG. 2A and FIG. 2B. The far side in the drawing sheet of FIG. 3 is oriented toward the left side in FIG. 2. As illustrated in FIG. 2A and FIG. 2B, the support ring 30 includes a flange portion 31, a cylindrical portion 32, and a bottom portion 33 (indicated by cross-hatching in FIG. 3). The flange portion 31 has an annular shape. The cylindrical portion 32 stands toward the left side (far side in FIG. 3) from the inner peripheral edge of the flange portion 31. The bottom portion 33 is bent toward the radially inner side from a left end portion of the cylindrical portion 32.

As illustrated in FIG. 2A and FIG. 2B, the flange portion 31 is sandwiched between opposed surfaces of the bearing housing 2 and the turbine housing 4. In this state, the bearing housing 2 and the turbine housing 4 are fastened by the fastening bolt 3 so that the support ring 30 is retained in the turbine housing 4.

As illustrated in FIG. 3, the bottom portion 33 has ring holes 33a formed at three locations at equal intervals in a circumferential direction. One end of the coupling pin 24 described above can be inserted into the bottom portion 33. The coupling pin 24 is inserted into the ring hole 33a, and one end of the coupling pin 24 is caulked. In such a manner, the support ring 30, the shroud ring 21, and the nozzle ring 22 are integrated.

Further, the bottom portion 33 has a plurality of recessed portions 34 arrayed in the circumferential direction. Support pieces 35 are provided to the recessed portions 34. As illustrated in FIG. 2, the support pieces 35 each include a support portion 35a and a removal prevention portion 35b. The support portion 35a is bent toward the right side (near side in FIG. 3) from the bottom portion 33. The removal prevention portion 35b is bent toward the radially outer side from the support portion 35a. The removal prevention portion 35b is arranged apart from the bottom portion 33 by a predetermined distance from the bottom portion 33 and faces the bottom portion 33. The drive ring 40 is supported by the support piece 35 so as to be rotatable (see FIG. 4). For example, the nozzle drive mechanism 20 may include another ring member, and the support pieces 35 may be mounted to this ring member. In this case, for example, the ring member is arranged on an outer periphery side on the drive ring 40 side adjacent to the support ring 30. The ring member is integrated with the support ring 30, the shroud ring 21, and the nozzle ring 22 with the coupling pin 24 caulked as mentioned above.

Figure 4:
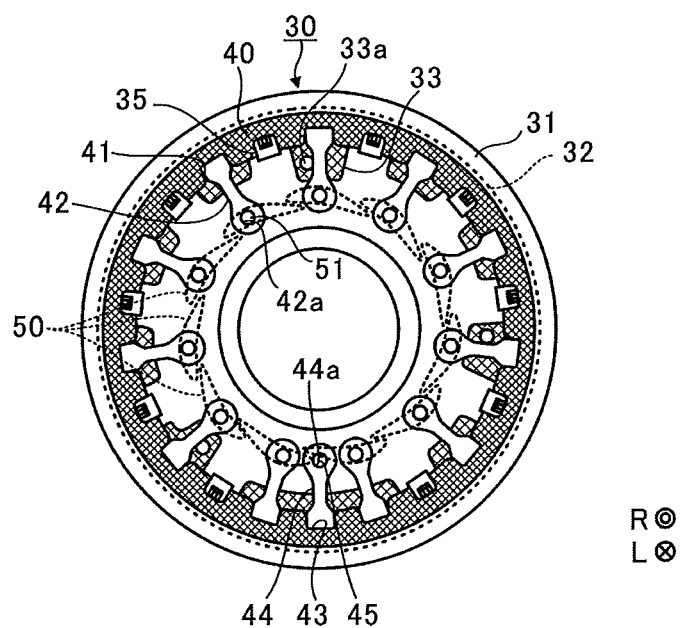
FIG. 4 is a view for illustrating a state in which a drive ring is supported by the support ring.

FIG. 4 is a view for illustrating a state in which the drive ring 40 is supported by the support ring 30. In FIG. 4, the bottom portion 33 of the support ring 30 is indicated by cross-hatching. In FIG. 4, the drive ring 40 is indicated by cross-hatching finer than that of the bottom portion 33.

The drive ring 40 is formed of an annular thin-plate member. An inner peripheral edge of the drive ring 40 is supported by the support pieces 35 of the support ring 30 so as to be rotatable. As illustrated in FIG. 2A and FIG. 4, the drive ring 40 has a plurality of first engagement recess portions 41 formed along the circumferential direction. The first engagement recess portions 41 are each formed by being cut out from an end portion of the drive ring 40 on an inner periphery side toward the radially outer side. One ends of transmission links 42 are engaged with the first engagement recess portions 41.

Further, as illustrated in FIG. 2B and FIG. 4, one second engagement recess portion 43 is formed at the end portion of the drive ring 40 on the inner periphery side. The second engagement recess portion 43 has the same shape as the first engagement recess portion 41. One end of the link plate 44 is engaged with the second engagement recess portion 43. The link plate 44 has the same shape as the transmission link 42.

A fitting hole 42a is formed on another end side of each transmission link 42. An insertion hole 44a is formed on another end side of the link plate 44. As illustrated in FIG. 2A, a blade shaft 51 is mounted to the fitting hole 42a in a state of being inserted therein. The blade shaft 51 is mounted to the nozzle vane 50. As illustrated in FIG. 2B, one end portion 45a of a drive shaft 45 is welded to the insertion hole 44a of the link plate 44.

Further, as illustrated in FIG. 2A, the blade shaft 51 is inserted into blade shaft holes 23b and 25b. The blade shaft 51 is axially supported in the blade shaft holes 23b and 25b so as to be rotatable. The blade shaft hole 23b is formed on the radially inner side with respect to the above-mentioned pin shaft hole 23a in the main body portion 21a of the shroud ring 21. The blade shaft hole 23b penetrates through the main body portion 21a in the thickness direction (axial direction of the shaft 8). A plurality of (eleven at equal intervals in this embodiment as one example, but one is shown in FIG. 2A) blade shaft holes 23b are formed apart from the main body portion 21a in the circumferential direction. The blade shaft holes 23b formed in the shroud ring 21 on a side opposite to the nozzle ring 22 over the nozzle vanes 50 may be omitted. In this case, the blade shafts 51 are inserted only into the blade shaft holes 25b formed in the nozzle ring 22 described later, and are axially supported so as to be rotatable (in a cantilever state).

Similarly, the blade shaft hole 25b is formed on the radially inner side with respect to the above-mentioned pin shaft hole 25a in the main body portion 22a of the nozzle ring 22. The blade shaft hole 25b penetrates through the main body portion 22a in the thickness direction (axial direction of the shaft 8). A plurality of (eleven at equal intervals as one example in this embodiment, but only one is shown in FIG. 2A) blade shaft holes 25b are formed in the circumferential direction of the main body portion 22a so as to be spaced apart. The blade shaft holes 23b formed in the shroud ring 21 are arranged so as to be opposed to the blade shaft holes 25b formed in the nozzle ring 22.

One end of the blade shaft 51 which is inserted into the blade shaft hole 25b of the nozzle ring 22 projects toward the right side from the nozzle ring 22. The one end of the blade shaft 51 is inserted into the fitting hole 42a of the transmission link 42. Through caulking of the projecting part at one end of the blade shaft 51, the transmission link 42 is fixed to the blade shaft 51.

In such a manner, the blade shafts 51 and the nozzle vanes 50 are arranged in the above-mentioned flow passage "x". The plurality of blade shafts 51 are annularly arrayed apart from each other in the rotation direction of the turbine impeller 9. The plurality of nozzle vanes 50 are annularly arrayed apart from each other in the rotation direction of the turbine impeller 9. As illustrated in FIG. 2B, the drive shaft 45 extends toward the right side from the drive ring 40. The extending portion of the drive shaft 45 is inserted into the bearing 46. In detail, the bearing 46 includes an annular main body portion 46a. The main body portion 46a is mounted to a mounting hole 2b formed in the bearing housing 2. Further, an inner peripheral surface of the bearing hole 46b of the main body portion 46a serves as a bearing surface. The drive shaft 45 is inserted into the bearing hole 46b. A rotation direction of the turbine impeller 9 is substantially the same as a circumferential direction of the main body portion 21a of the shroud ring 21 or a circumferential direction of the main body portion 22a of the nozzle ring 22.

The one end portion 45a of the drive shaft 45 projects toward the left side in FIG. 2B (one side) from the bearing hole 46b. The link plate 44 is engaged with the one end portion 45a of the drive shaft 45. Further, another end portion 45b of the drive shaft 45 projects toward the right side in FIG. 2B (another side) from the bearing hole 46b of the bearing 46. A drive lever 47 is coupled to another end portion 45b side of the drive shaft 45. The bearing 46 is arranged between the link plate 44 and the drive lever 47. Further, an actuator 60 is provided outside the housing of the variable capacity turbocharger C (see FIG. 1). The drive lever 47 is coupled to the actuator 60.

When the actuator 60 drives the drive lever 47, as illustrated in FIG. 2B, the drive lever 47 and the drive shaft 45 swing (turn). The drive lever 47 and the drive shaft 45 swing about an axial center of the drive shaft 45 as a rotation center. The rotation power from the actuator 60 is transmitted to the link plate 44, thereby causing the link plate 44 to swing (turn).

The second engagement recess portion 43 is pressed against the link plate 44 illustrated in FIG. 4 in the rotation direction. In such a manner, the drive ring 40 rotates. When the drive ring 40 rotates, the transmission links 42 engaged respectively with the plurality of first engagement recess portions 41 are pressed by the rotation of the drive ring 40 in the rotation direction to swing. Along with the swinging of the transmission links 42, the plurality of blade shafts 51 rotate. When the blade shafts 51 rotate, along with the rotation of the blade shafts 51, the plurality of nozzle vanes 50 change angles of the nozzle vanes 50 with respect to the radial direction in the flow passage "x". In such a manner, the nozzle drive mechanism 20 causes the link plate 44 to swing by the power of the actuator 60. Then, the nozzle drive mechanism 20 synchronously changes the angles of the plurality of nozzle vanes 50. The nozzle drive mechanism 20 is capable of variously changing the flow passage width (so-called nozzle throat width) of adjacent nozzle vanes 50. That is, the nozzle drive mechanism 20 adjusts the opening degree of the nozzle vanes 50 to variously change the flow passage area of the flow passage "x".

Figure 5A:
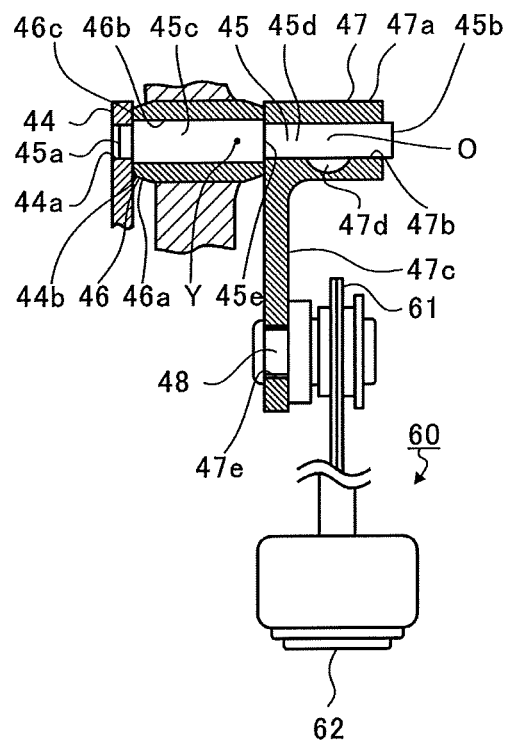
FIG. 5A is an illustration of a periphery of a drive shaft in this embodiment.
Figure 5B:
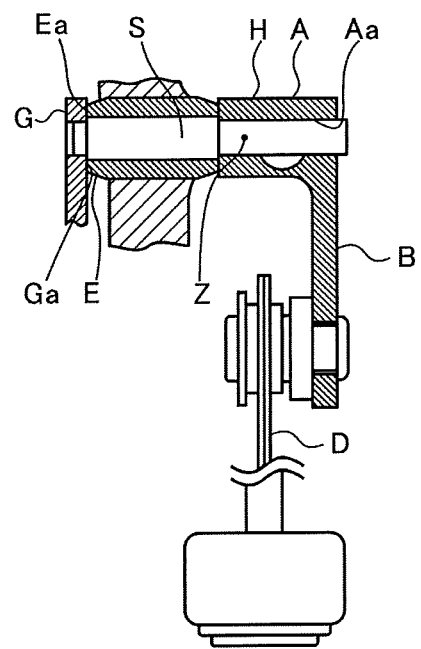
FIG. 5B is an illustration of a periphery of a drive shaft in a comparative example.

FIG. 5A is an illustration of a periphery of the drive shaft 45 in this embodiment. FIG. 5B is an illustration of a periphery of a drive shaft S in a comparative example.

As illustrated in FIG. 5A, the drive shaft 45 has a small-diameter portion 45d on the another end portion 45b side, which is smaller in diameter than a part (large-diameter portion 45c) inserted into the bearing 46 and axially supported thereat. The insertion portion 47a of the drive lever 47 has an insertion hole 47b. The insertion hole 47b receives the small-diameter portion 45d inserted thereinto. A step surface 45e is formed by a difference in outer diameter between the small-diameter portion 45d and the large-diameter portion 45c. The step surface 45e extends in a radial direction of the drive shaft 45. The step surface 45e is a surface connecting the small-diameter portion 45d and the large-diameter portion 45c to each other. For example, the step surface 45e is a surface orthogonal to the axial direction of the drive shaft 45. A corner portion that continues to the small-diameter portion 45d and the large-diameter portion 45c may have, for example, a chamfered shape or a curved surface shape such as a round shape.

The drive lever 47 includes an insertion portion 47a and a coupling portion 47c. The insertion portion 47a extends in the axial direction of the drive shaft 45. The coupling portion 47c extends (projects) in the radial direction from an outer peripheral surface of the insertion portion 47a. The drive lever 47 has, for example, a substantially L-shape in section including a center of the drive shaft 45. The insertion portion 47a has, for example, a cylindrical shape. In the insertion portion 47a, the small-diameter portion 45d of the drive shaft 45 is inserted to reach a position in abutment against the step surface 45e. The outer peripheral surface of the insertion portion 47a has the coupling portion 47c. The coupling portion 47c projects in the radial direction of the insertion hole 47b (drive shaft 45). The coupling portion 47c is positioned in the insertion portion 47a on the bearing 46 side with respect to a center O in the axial direction of the drive shaft 45. The coupling portion 47c has, for example, a flat-plate shape.

The insertion portion 47a has an exposure hole 47d. The exposure hole 47d penetrates from the insertion hole 47b to the outer peripheral surface of the insertion portion 47a. The coupling portion 47c is positioned on the bearing 46 side with respect to the exposure hole 47d. A part of the drive shaft 45 which is inserted into the insertion portion 47a is exposed through the exposure hole 47d in the radial direction. The part of the drive shaft 45 which is exposed through the exposure hole 47d is welded to the insertion portion 47a. In such a manner, the drive lever 47 is engaged with the drive shaft 45.

The coupling portion 47c has a link hole 47e. The link hole 47e penetrates through the coupling portion 47c in a right-and-left direction in FIG. 5A (axial direction of the drive shaft 45). The link hole 47e receives a link pin 48 inserted from the right side in FIG. 5A. A projecting part of the link pin 48 on the left side is, for example, caulked. In such a manner, the link pin 48 is coupled to the coupling portion 47c. The link pin 48 is in a state of being substantially parallel to the drive shaft 45. The link pin 48 may be slightly inclined with respect to the drive shaft 45 depending on dimension accuracy and mounting tolerance.

Further, the rod member 61 of the actuator 60 is connected to a part of the link pin 48 which projects toward the right side in FIG. 5A from the link hole 47e. That is, the coupling portion 47c is engaged with the rod member 61 from the link plate 44 side. For example, the link pin 48 is fitted to (inserted into) a hole formed in the rod member 61 with a clearance in the radial direction. That is, the rod member 61 is connected so as to be rotatable with respect to the link pin 48.

The rod member 61 moves in an up-and-down direction in FIG. 5A with power received from a main body 62 of the actuator 60. With this, the drive lever 47 pressed by the rod member 61 turns about a center axis of the drive shaft 45 as a rotation center. Then, the drive shaft 45 fixed to the drive lever 47 rotates together with the drive lever 47. In such a manner, the link plate 44 swings in a rotation direction about the center axis of the drive shaft 45 as a rotation center.

In the foregoing, description is made of the case in which the rod member 61 is connected so as to be rotatable with respect to the link pin 48 while the coupling portion 47c and the link pin 48 are fixed. However, the coupling portion 47c may be connected so as to be rotatable with respect to the link pin 48 while the rod member 61 and the link pin 48 are fixed.

Incidentally, an opposing surface 46c of the bearing 46 with respect to the link plate 44 is held in abutment against an abutment portion 44b of the link plate 44. The opposing surface 46c and the abutment portion 44b slide along with swinging of the link plate 44. Friction is generated between the opposing surface 46c and the abutment portion 44b. Therefore, with regard to the drive shaft 45 and the link plate 44 and the drive lever 47 (hereinafter referred to as "rotary body") which are integrally rotated with the drive shaft 45, a gravity center position Y on an axial center of the drive shaft 45 affects a magnitude of the friction.

In the embodiment illustrated in FIG. 5A, the coupling portion 47c of the drive lever 47 is arranged on the bearing 46 side with respect to the rod member 61. That is, the rod member 61 is positioned on a side opposite to the bearing 46 with respect to the coupling portion 47c. For example, the coupling portion 47c projects from the bearing 46 side of the insertion portion 47a of the drive lever 47.

In the comparative example illustrated in FIG. 5B, a coupling portion B of the drive lever A is positioned on a side opposite to a bearing E side with respect to a rod member D. In this case, with regard to a rotary body including the drive lever A and the drive shaft S, a gravity center position Z on an axial center of the drive shaft S is positioned inside an insertion hole Aa of the drive lever A.

That is, the gravity center position Z of the rotary body is shifted to the right side in FIG. 5B with respect to the bearing E. A part of the rotary body on the right side is inclined toward a lower side in the vertical direction. A part of the rotary body on the left side is inclined toward an upper side in the vertical direction. The drive shaft S rotates in this state. When an opposing surface Ea of the bearing E and an abutment portion Ga of the link plate G slide along with swinging of the link plate G, friction increases.

Meanwhile, as illustrated in FIG. 5A, the insertion portion 47a is arranged on the bearing 46 side with respect to the rod member 61. With this, the gravity center position Y of the rotary body is brought closer to the link plate 44 side as compared to the comparative example. The gravity center position Y of the rotary body is positioned, for example, inside the bearing 46.

As a result, inclination of the rotary body in the vertical direction is suppressed. Therefore, friction generated between the opposing surface 46c of the bearing 46 and the abutment portion 44b of the link plate 44 is suppressed. The durability can be improved.

Further, for example, when the variable capacity turbocharger C has a small size, and a clearance between the turbine housing 4 and the compressor housing 6 is also small, as in the above-mentioned embodiment, the drive shaft 45 is often welded to the insertion portion 47a. Through welding through intermediation of the exposure hole 47d, ease of the operation of mounting the drive shaft 45 to the insertion portion 47a is improved.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

For example, in the above-mentioned embodiment, description is made of the semi-floating bearing as an example of the radial bearing 7. However, the radial bearing 7 is not limited to the semi-floating bearing. For example, the radial bearing 7 may be a slide bearing such as a full-floating bearing, or a rolling bearing such as a ball bearing.

Moreover, in the above-mentioned embodiment, description is made of the case in which the step surface 45e is formed by the difference in outer diameter between the small-diameter portion 45d and the large-diameter portion 45c. However, the step surface 45e is not essentially required. When a clearance between the drive lever 47 and the bearing 46 is suitably set with, for example, a jig, it is not required that the step surface 45e be formed on the drive shaft 45. The drive shaft 45 may have a straight shape. In this case, a distance between an end surface of the link plate 44 on the drive lever 47 side and an end surface of the drive lever 47 on the link plate 44 side is set slightly larger than a length of the bearing 46.

Moreover, in the above-mentioned embodiment, description is made of the case in which the coupling portion 47c is formed so as to continue from an end surface of the insertion portion 47a on the bearing 46 (bearing housing 2) side as illustrated in FIG. 5A. However, the coupling portion 47c may be formed, for example, so as to be separated toward the right side in FIG. 5A from the end surface on the bearing 46 side. Even in this case, the same effect as the above-mentioned embodiment is attained as long as the coupling portion 47c is provided on the bearing 46 side with respect to the rod member 61.

Further, in the above-mentioned embodiment, description is made of the case in which the support pieces 35 are provided to the bottom portion 33 of the support ring 30. However, it is not limited to the configuration in which the support pieces 35 are provided to the bottom portion 33. For example, as disclosed in JP 2011-85054 A, a guide ring member may be additionally provided on the side surface of the support ring 30. Further, there may also be adopted a configuration in which the drive ring 40 is supported by the support pieces 35 formed on the guide ring member. Moreover, when the guide ring member is additionally provided, the recessed portions 34 are not essentially required. As disclosed in JP 2011-85054 A, it is not always required that the recessed portions 34 be formed at the end portion of the support ring 30 on the inner periphery side.

Further, in the above-mentioned embodiment, description is made of the case in which the exposure hole 47d is formed in the insertion portion 47a. However, the exposure hole 47d is not essentially required. It is assumed that a space between the compressor housing 6 and the bearing housing 2 in the axial direction of the shaft 8 becomes smaller along with downsizing of the variable capacity turbocharger C. In this case, when the exposure hole 47d is formed, the operation of welding the drive shaft 45 to the insertion portion 47a from the radial direction of the shaft 8 becomes easier.

INDUSTRIAL APPLICABILITY

The present disclosure is usable for a nozzle drive mechanism, a turbocharger, and a variable capacity turbocharger, in which a link pin coupled to a drive lever is connected to a rod member of an actuator.

What is claimed is:

1. A nozzle drive mechanism, comprising:
    a bearing having a bearing hole;
    a drive shaft which is axially supported in the bearing hole so as to be rotatable;
    a drive lever including:
        an insertion portion extending axially into which an end portion of the drive shaft protruding from the bearing hole is inserted, the insertion portion presenting a cylindrical shape; and
        a coupling portion, which is positioned on a bearing side of the insertion portion with respect to a center of the drive shaft in an axial direction, and extends outward in a radial direction of the drive shaft from an outer peripheral surface of the insertion portion, the coupling portion presenting a flat-plate shape;
    a link pin coupled to the coupling portion; and
    a rod member, which is connected to the link pin, is positioned on a side opposite to the bearing with respect to the coupling portion, and is provided to an actuator,
    wherein a gravity center position of a rotary body including the drive shaft and elements which are integrally rotated with the drive shaft is positioned inside the bearing.

2. The nozzle drive mechanism according to claim 1, wherein, in the axial direction, the link pin is closer to the bearing than the rod member.

3. The nozzle drive mechanism according to claim 1,
    wherein the insertion portion of the drive lever has an exposure hole for exposing the drive shaft in a radial direction, and
    wherein at least a part of the drive shaft which is exposed through the exposure hole is welded to the insertion portion.

4. The nozzle drive mechanism according to claim 3, wherein the coupling portion is positioned on the bearing side with respect to the exposure hole.

5. A turbocharger, comprising the nozzle drive mechanism of claim 4.

6. A turbocharger, comprising the nozzle drive mechanism of claim 3.

7. A turbocharger, comprising the nozzle drive mechanism of claim 1.

8. A variable capacity turbocharger, comprising:
    a drive ring supported so as to be rotatable;
    a link plate, which is engaged with the drive ring, and is configured to turn the drive ring;
    a drive shaft, which is engaged with the link plate, and is configured to turn the link plate;
    a drive lever, which includes a coupling portion projecting in a radial direction, is engaged with the drive shaft, and is configured to turn the drive shaft the coupling portion presenting a flat-plate shape;
    a bearing, which receives the drive shaft inserted thereinto, and is provided between the link plate and the drive lever; and
    a rod member, which receives the coupling portion engaged therewith from the link plate side, and is configured to turn the drive lever,
    wherein a gravity center position of a rotary body including the drive shaft and elements which are integrally rotated with the drive shaft is positioned inside the bearing.

9. The variable capacity turbocharger according to claim 8, wherein, in the axial direction, the rod member is closer to the bearing than a free end of the drive shaft.

* * * * *